July 7, 1925.
G. RIETTI
AIRCRAFT
Filed June 5, 1924  2 Sheets-Sheet 1
1,545,198
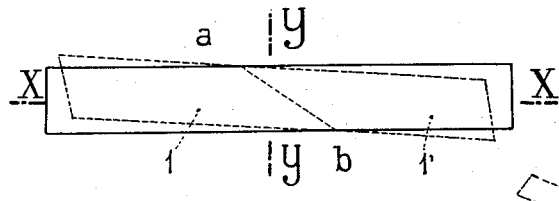
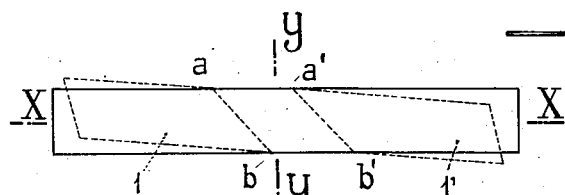
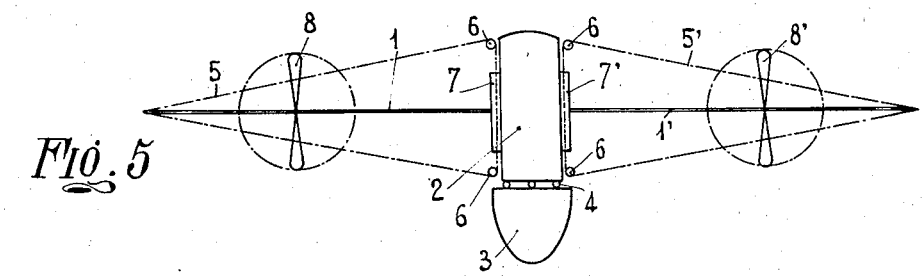
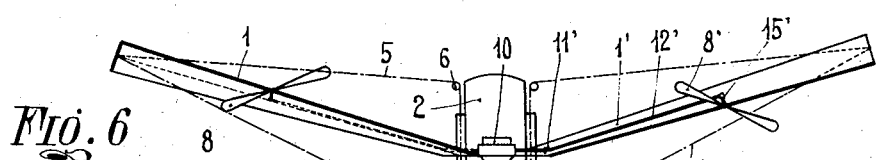
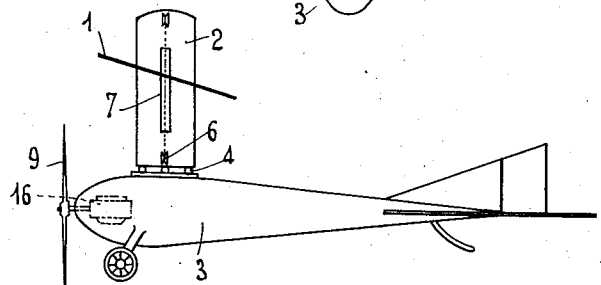
Inventor
G. Rietti
by Langner, Parry, Card & Langner
Attys.

July 7, 1925.  
G. RIETTI  
AIRCRAFT  
Filed June 5, 1924

Inventor
G. Rietti
by Langner, Parry, Card & Langner
Attys.

Patented July 7, 1925.

1,545,198

UNITED STATES PATENT OFFICE.

GIACOMO RIETTI, OF MILAN, ITALY.

AIRCRAFT.

Application filed June 5, 1924. Serial No. 718,122.

*To all whom it may concern:*

Be it known that I, GIACOMO RIETTI, subject of the King of Italy, residing at Milan, Italy, have invented certain new and useful Improvements in Aircraft, of which the following is a specification.

The present invention relates to aircrafts and has for its object an aircraft adapted both for upward and downward vertical displacement and for straight travel.

The aircraft according to the present invention comprises sustaining surfaces adapted to take up such positions as to provide one or more screw propellers having for its or their axes, respectively, the vertical axis of the aircraft, or the position usual in aeroplanes as sustaining surfaces, while the aircraft propelling means are adapted to produce both a rotation of the whole aircraft around said axis, or a straight travel.

On the annexed drawing are shown embodiments of the present invention, and:

Figure 1 is a plan view diagram illustrative of the principle on which the present invention is based;

Figure 2 is a side view diagram corresponding to Figure 1;

Figure 3 is a further plan view diagram and

Figure 4 is a corresponding side view diagram.

Figure 5 is a diagrammatic front view of an aeroplane according to the present invention in travelling conditions;

Figure 6 is a similar front view of the same in conditions for vertical motion;

Figure 7 is a diagrammatical side view of the same;

Figure 8:
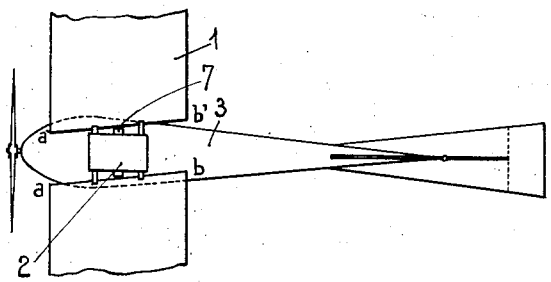
Figure 8 is a diagrammatic plan view of the said construction.

According to the present invention the sustaining surfaces of the aeroplane are provided by wings having any suitable shape, as used in aircrafts, and said wings are hinged at the central portion of the same in a manner to be able to swing around axes which are parallel to each other and inclined with respect to the direction of travel and to the longitudinal wing axis.

For making clear the principle on which the present invention is based, reference may be had to Figures 1 and 2 where is shown the position which may be taken up in said condition by two adjacent plane portions 1—1', hinged around an axis —*a—b*— inclined with respect to plane axis —*x—x*— and to line —*y—y*— which is assumed to show the direction of travel of an aircraft in which said surfaces are embodied as sustaining surfaces; as shown in said figures, by rotating said surfaces in opposed directions around line —*a—b*—, the same surfaces, which at the beginning are flat in the same plane, come to lie in a screw surface as shown by dotted-line position.

A similar condition is produced when said surfaces 1, 1' instead of being pivoted around a common axis, are hinged around two separate lines parallel with each other and inclined with respect to the line of travel and to the longitudinal axis of the combined surfaces when in flat alignment with each other (see Figures 3 and 4).

By applying this principle, the surfaces providing the wings of a common aeroplane may be easily converted into the blades of a screw with vertical axis adapted to produce, when the aeroplane is driven in rotation, a vertical displacement of the same.

In the construction of Figures 5—8, 1 and 1' are two wings of a monoplane and 2 is the central cabin or body on which are hinged at its two sides the wings 1, 1' around lines —*a—b*—, —*a'—b'*; 3 is the fuselage which may be of any desired construction and on which the cabin 2 is mounted to rotate around a vertical axis by means of rollers or balls 4. Said wings 1, 1' are connected with the cabin 2 by means of endless cords 5—5' attached to the ends of the frames of said wings, said cords running on pulleys 6 and being operated by power by means of a hydraulic or pneumatic service motor as shown diagrammatically by 7—7' and which may consist of a cylinder supplied at either end with a fluid under pressure and having a piston operated by said fluid and actuating by its stem said cords. By shifting downwardly the operating member of said service motor, the upper portion of cords 5—5' is shortened while their lower portion is correspondingly elongated and therefore the said wings 1, 1' take the position shown in Figure 6 in which they lie in a screw surface having its axis coincident with that of cabin 2.

Each of the wings 1, 1' has, say at the middle of its length, a screw propeller 8, 8' driven by an engine 10 located in the cabin 2 and driving said propellers by means of universal joints 11, 11', shafts 12, 12' and gearings 15, 15', and one of said propellers 8, 8' must be adapted for reverse drive or for reversing its pitch for the purpose of reversing the direction of the thrust produced thereby.

Thus, when the said wings 1, 1' are in the position shown by Figure 5 in which they are on the alignment of each other and both propellers are assumed to produce an action in the same direction, the whole apparatus is travelling forward, while when the surfaces 1, 1' are in the position shown by Figure 6 and the propellers 8—8' produce an action in reverse direction to each other, the wings and the cabin are caused to rotate around the axis of the cabin and thus, by a suitable inclination of the surfaces 1, 1', the apparatus is moved upwardly.

As shown by Figures 7 and 8, the aeroplane is conveniently provided with a propeller 9 driven by an engine 16, both arranged in the fuselage 3, for the purpose of producing a forward motion of the aeroplane while the propellers 8—8' are operated for producing a rotary motion of the cabin and wings connected therewith.

Figure 9:
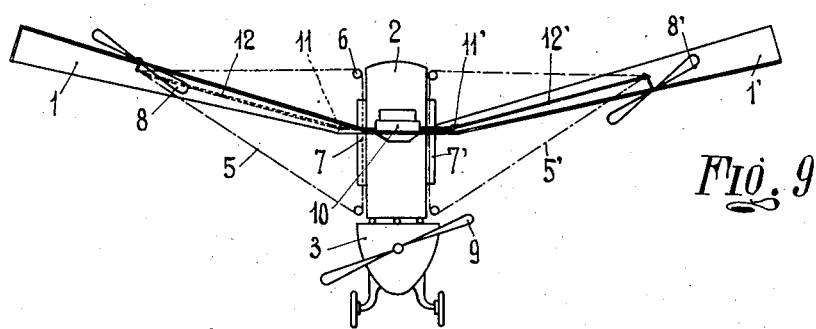
Figure 9 is a diagrammatic front view of a modification.

In the construction of Figure 9, the wings 1, 1' are controlled by means of endless cords 5—5' connected at intermediate points of said wings, and said cords are in turn operated by service-motors 7—7' as hereinbefore described, to cause the said wings 1, 1' to oscillate around lines —a—b—, —a'—b'—. In this figure is also shown the engine 10 for driving the propellers 8—8' by means of joints 11, 11', shafts 12, 12' and gears 15—15' these parts being arranged on the wing frames.

Figure 10:
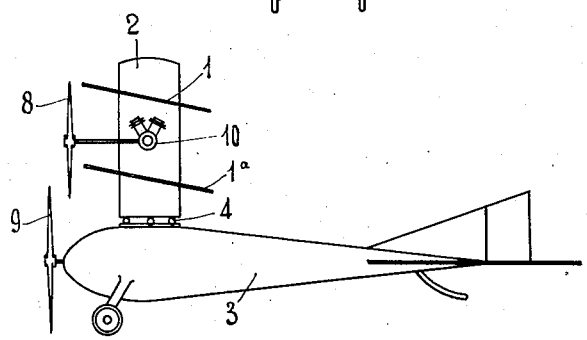
Figure 10 is a side view of a modification having two sets of supporting surfaces.

Figure 10 shows a construction which is similar to the above described ones, the apparatus being provided with two sets of wings 1, 1ª, each of said wings being adapted to be oscillated around an axis inclined to the direction of travel of the aeroplane.

The control of the wings by means of ties or cords is useful in that it makes it easy to exert the required action and to withstand the centrifugal actions which take place during the rotation of the wings, but of course the mounting of said wings may be produced in other manners.

Figure 11:
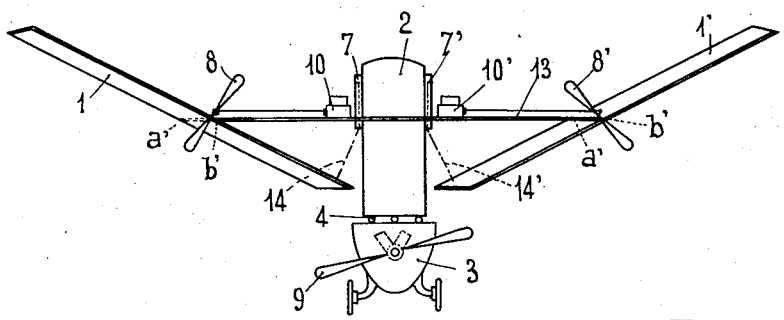
Figure 11 is a diagrammatic front view of a further modification.

Figure 11 shows a construction in which the wings 1, 1' are mounted to rotate around lines —a'—b'— lying intermediate the ends of said wings and are carried by a structure 13 on which are mounted the cabin 2 and the fuselage 3, said structure carrying two engines 10—10' for driving the propellers 8—8'. The two wings 1, 1' are in this construction moved by actuating their inner ends by means of cords 14—14' operated by mechanical means or by service motors 7—7'.

In all the constructions illustrated the wings may be located on the alignment of each other, that is to provide the sustaining surfaces of an ordinary aeroplane, and then when the propellers 8, 8' and the central propeller 9, if any, are operated to produce an action in the same direction, the usual operation of an aeroplane is obtained.

Should on the contrary the wings 1, 1' be inclined and the propellers 8—8' be caused to produce actions in opposed directions, the wings are caused to rotate around their axis, with or without upward motion, according to the inclination imparted to said wings 1, 1'.

During such an operation, the propeller 9 may act to produce a motion or to counteract the wind action. This aerial vehicle is thus able to rise and descend vertically and to remain suspended in the air or to move in any direction as desired, without the conditions of operation being substantially different with respect to present aeroplanes and without requiring complicated construction and operations.

What I claim as my invention and desire to secure by United States Letters Patent is:—

1. An aircraft comprising, a central body, wings pivoted on said body along lines inclined at equal angles with respect to the aircraft line of travel, means for shifting said wings from an aligned position in which they provide the aircraft sustaining surfaces, to an inclined position, in which they provide propeller blades, and viceversa, and propelling means for obtaining the aircraft travel when the said wings are in aligned position and for producing a rotation of said body and wings around their vertical axis when said wings are inclined.

2. An aircraft comprising a central body, wings pivoted on said body along lines inclined at equal angles with respect to the aircraft line of travel, means for shifting said wings from an aligned position, in which they provide the aircraft sustaining surfaces, to an inclined position, in which they provide propeller blades, and viceversa, and reversible propelling means for obtaining the aircraft travel when the said wings are in aligned position and for producing a rotation of said body and wings around their vertical axis when the said wings are inclined.

3. An aircraft comprising a central body, wings pivoted on said body along lines inclined at equal angles with respect to the aircraft line of travel, means for shifting said wings, from an aligned position in which they provide the aircraft sustaining surfaces, to an inclined position, in which they provide propeller blades, and vice-versa, and propelling means on certain of said wings and reversible propelling means on the other of said wings.

4. An aircraft comprising a central body, wings pivoted on said body along lines inclined at equal angles with respect to the aircraft line of travel, means for shifting said wings from an aligned position, in which they provide the aircraft sustaining surfaces, to an inclined position, in which they provide propeller blades, and vice-versa, means for propelling said aircraft along said line of travel and means on said wings and body for causing them to rotate about their vertical axis.

5. An aircraft comprising a fuselage, a structure rotatably connected with said fuselage, wings pivoted on said structure along lines inclined at equal angles with respect to the aircraft line of travel, means for shifting said wings from an aligned position, in which they provide the aircraft sustaining surfaces, to an inclined position, in which they provide propeller blades, and vice-versa, propelling means on said fuselage and propelling means on said wings for producing the rotation of said wings and structure about an axis vertical with respect to said fuselage.

In testimony whereof I have signed my name to this specification.

ING. GIACOMO RIETTI.